United States Patent [19]
Yamaguchi et al.

[11] Patent Number: 5,974,880
[45] Date of Patent: Nov. 2, 1999

[54] CAPACITANCE ACCELERATION SENSOR

[75] Inventors: Yasuo Yamaguchi; Hiroshi Otani, both of Tokyo, Japan

[73] Assignee: Mitsubishi Denki Kabushiki Kaisha, Tokyo, Japan

[21] Appl. No.: 08/997,550

[22] Filed: Dec. 23, 1997

[30]     Foreign Application Priority Data

Jun. 25, 1997 [JP] Japan .................................... 9-168589

[51] Int. Cl.⁶ .............................................. G01P 15/125
[52] U.S. Cl. ..................................... 73/514.32; 73/514.36
[58] Field of Search ............................ 73/514.32, 514.36, 73/514.37, 514.38, 514.18, 514.21, 514.23, 514.24

[56]              References Cited

U.S. PATENT DOCUMENTS

4,663,972  5/1987  Gerard ................................. 73/514.32
5,597,956  1/1997  Ito et al. .............................. 73/514.32

FOREIGN PATENT DOCUMENTS

5-333052  12/1993  Japan .
7-36065    7/1995  Japan .
9-018017   1/1997  Japan .

*Primary Examiner*—John E. Chapman

[57]              ABSTRACT

The present invention is intended to improve the output characteristics of a capacitance acceleration sensor to increase the stability on the detection accuracy by ensuring that a movable electrode can be displaced while remaining as constantly parallel with stationary electrodes as possible. The invention provides a capacitance acceleration sensor having a frame Fm which constitutes the body of the sensor, a movable electrode 13 which is disposed in the frame Fm and which is supported so as to be capable of being displaced in a specific direction in response to acceleration, and stationary electrodes 12 which are disposed so as to face the movable electrode 13 in the specific direction; and detecting the magnitude of an acceleration acting in the specific direction, on the basis of the change in an electrostatic capacitance caused by the variations in the distances between the electrodes. The capacitance acceleration sensor is characterized in that the movable electrode 13 is cantilevered by the frame Fm with a plurality of beams 14 which are provided in a plane parallel with the specific direction and which are capable of elastically flexing in the specific direction.

1 Claim, 5 Drawing Sheets

CAPACITANCE ACCELERATION SENSOR

BACKGROUND OF THE INVENTION

The present invention relates to a capacitance acceleration sensor for detecting the magnitude of an acceleration acting in a specific direction on the basis of the change in an electrostatic capacitance caused by the variations in the distances between a movable electrode and stationary electrodes.

As disclosed in, for example, Japanese Utility Model Laid-Open Publication No. Hei 7-36065, Japanese Patent Laid-Open Publications Nos. Hei 5-333052 and Hei 918017, there has been conventionally known a capacitance acceleration sensor in which a movable electrode to be displaced in a specific direction in response to acceleration and stationary electrodes facing the movable electrode in the specific direction are disposed in a frame constituting the sensor body so that the magnitude of an acceleration acting in the specific direction is detected on the basis of the change in an electrostatic capacitance caused by the variations in the distances between these electrodes.

In this type of acceleration sensor: the movable electrode acts as a mass for use in the detection of acceleration; the movable electrode (the mass) swings when an acceleration is exerted in the specific direction; and the magnitude of the swing (the magnitude of the acceleration) is detected on the basis of the change in an electrostatic capacitance caused by the variations in the distances between the movable electrode and the stationary electrodes, and is outputted as an electric signal. In the capacitance acceleration sensor, it has been found that the displacement of the movable electrode remaining parallel with the stationary electrodes would provide a linear output and increase the stability on the detection accuracy.

The thickness of beam(s) supporting the movable electrode as the mass is typically set so small as to allow the quantity of the swing of the mass caused by an acceleration to be as large as possible to improve the detection accuracy and the sensitivity.

In the sensor disclosed in Japanese Utility Model Laid-Open Publication No. Hei 7-36065, the movable electrode (the referential mass) is supported with an elastic hinge by the frame, so that an acceleration causes an angular displacement of the movable electrode about the hinge. That is, it is difficult to ensure the linearity of the outputs of the sensor because the movable electrode pivoting about the hinge is incapable of remaining parallel with the stationary electrodes when the movable electrode is displaced by an acceleration.

In the sensors disclosed in Japanese Patent Laid-Open Publications Nos. Hei 5-333052 and Hei 9-18017, the movable electrode is supported by the frame with a plurality of beams, which are provided so as to extend in a plane orthogonal to the specific direction (the direction in which the movable electrode is displaced).

Such sensors as shown in FIG. 7 or 8 are known as sensors in which the movable electrode is supported with one or more beams provided within a plane parallel with the specific direction of the displacement of the movable electrode.

In the sensor shown in FIG. 7 (hereinafter referred to as a prior art 1), a movable electrode 63 is supported with a beam 64 by a frame 61. As shown in FIG. 9 in detail, when an acceleration acts in the direction of the arrow, the movable electrode 63 is tilted and displaced in the direction of the arrow and is incapable of remaining parallel with the stationary electrodes 62 (see the dashed lines in FIG. 9). As shown in the dot-and-dash curve in FIG. 4, for example, the linearity of the sensor outputs resulted from the variations in the distances between the electrodes is impaired relative to the variation in the magnitude of acceleration, and it is therefore difficult to obtain a sufficient reliability of the detection accuracy.

In the sensor shown in FIG. 8 (hereinafter referred to as a prior art 2), a movable electrode 73 is supported by a frame 71 with two beams 74 extending from both sides of the electrode 73 and the two beams 74 are disposed in different positions (in diagonal corners of the movable electrode 73) with respect to the specific direction in which the movable electrode 73 is displaced.

As shown in FIG. 10 in detail, when an acceleration acts on the sensor in the direction of the arrow, the movable electrode 73 is tilted and displaced in the direction of the arrow, as shown in the dashed lines in FIG. 10, and is incapable of remaining parallel with the stationary electrodes 72. This tendency becomes more noticeable particularly in the case that the center "Gv" of gravity of the movable electrode 73 is apart from the symmetrical center of the electrode 73. As a result, it has been impossible to ensure the linearity of the outputs of the sensor and it has been difficult to sufficiently increase the stability on the detection accuracy.

SUMMARY OF THE INVENTION

The present invention, which has been done in consideration of the above technical problems, is intended to improve the output characteristics of a capacitance acceleration sensor to increase the stability on the detection accuracy by ensuring that a movable electrode can be displaced while remaining as constantly parallel with stationary electrodes as possible.

For that purpose, a first aspect of the present invention provides a capacitance acceleration sensor having a frame which constitutes the body of the sensor, a movable electrode which is disposed in the frame and which is supported so as to be capable of being displaced in a specific direction in response to acceleration, and stationary electrodes which are disposed so as to face the movable electrode in the specific direction; and detecting the magnitude of an acceleration acting in the specific direction, on the basis of the change in an electrostatic capacitance caused by the variations in the distances between the electrodes; the capacitance acceleration sensor characterized in that the movable electrode is cantilevered by the frame with a plurality of beams which are provided in a plane parallel with the specific direction and which are capable of elastically flexing in the specific direction.

Further, according to a second aspect of the present invention, there is provided a capacitance acceleration sensor, based on the first aspect of the present invention, wherein the distance between the center of the parts of the movable electrode supported by the plurality of beams and the center of gravity of the movable electrode is set so as to be not more than a given value.

Furthermore, according to a third aspect of the present invention, there is provided a capacitance acceleration sensor, based on the second aspect of the present invention, wherein the center of the parts of the movable electrode supported by the plurality of beams and the center of gravity of the movable electrode are set so as to coincide or generally coincide with each other.

Furthermore, according to a fourth aspect of the present invention, there is provided a capacitance acceleration sensor having a frame which constitutes the body of the sensor, a movable electrode which is disposed in the frame and which is supported so as to be capable of being displaced in a specific direction in response to acceleration, and stationary electrodes which are disposed so as to face the movable electrode in the specific direction; and detecting the magnitude of an acceleration acting in the specific direction, on the basis of the change in an electrostatic capacitance caused by the variations in the distances between the electrodes; the capacitance acceleration sensor characterized in that both sides of the movable electrode are supported by the frame with a plurality of beams which are provided in a plane parallel with the specific direction, which are arranged generally in a line across the movable electrode, and which are capable of elastically flexing in the specific direction.

Furthermore, according to a fifth aspect of the present invention, there is provided a capacitance acceleration sensor, based on the fourth aspect of the present invention, wherein the lengths of the beams disposed on both sides of the movable electrode are set so as to be generally equal to one another.

Furthermore, according to a sixth aspect of the present invention, there is provided a capacitance acceleration sensor, based on the fourth or fifth aspect of the present invention, wherein the center of gravity of the movable electrode is positioned generally on the line linking the centers of the parts on both sides of the movable electrode supported by the plurality of beams.

DETAILED DESCRIPTION OF THE PREFERRED EMBODIMENTS

Hereinafter, some embodiments of the present invention will be described in detail referring to the appended drawings.

(First Embodiment)

Figure 1:
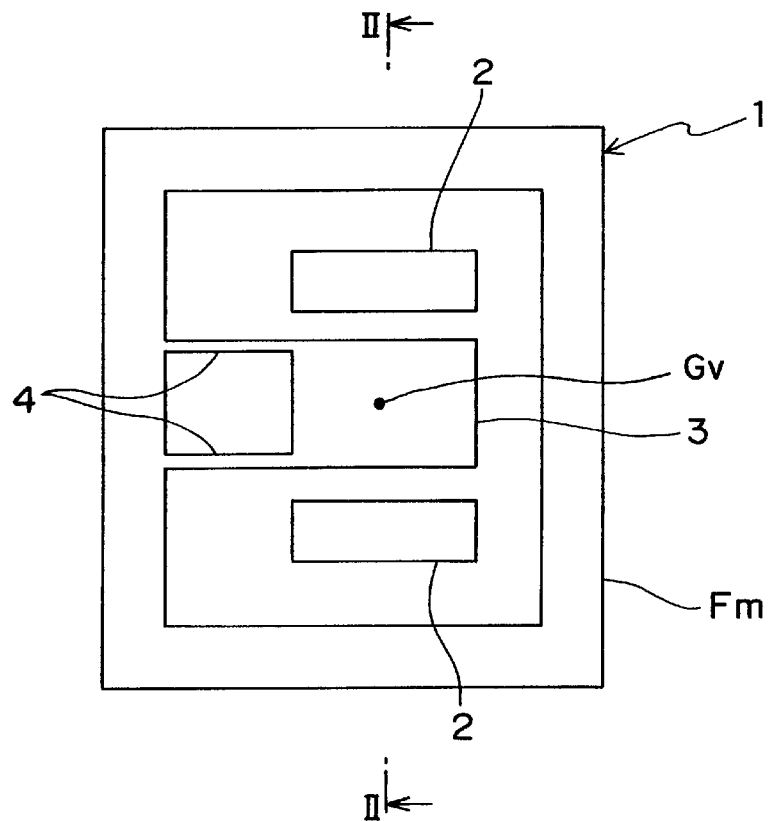
FIG. 1 is an illustrative plan view illustrating the inside of a capacitance acceleration sensor in accordance with a first embodiment of the invention.
Figure 2:
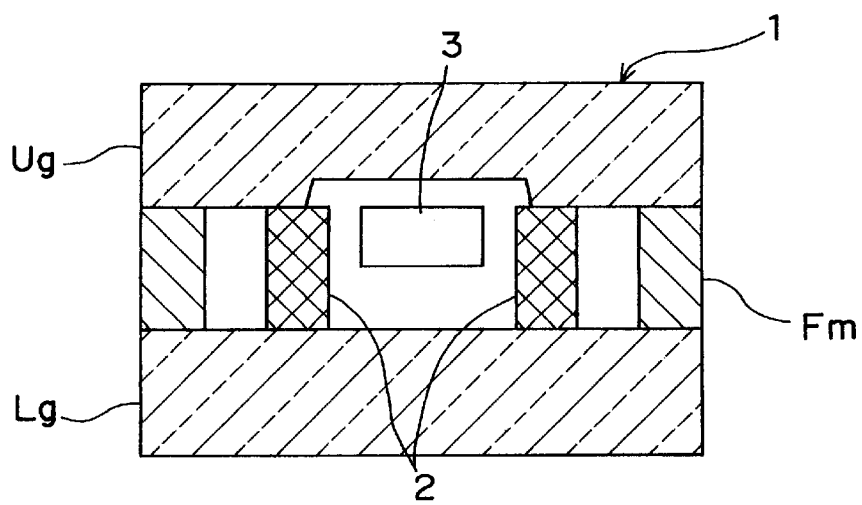
FIG. 2 is an illustrative vertical section of the acceleration sensor along the line II—II of FIG. 1.

FIG. 1 is an illustrative plan view illustrating the inside of a capacitance acceleration sensor 1 (hereinafter, it may be referred to simply as an acceleration sensor, for convenience) in accordance with the first embodiment and FIG. 2 is an illustrative vertical section of the acceleration sensor 1.

As shown in the drawings, the acceleration sensor 1 comprises a frame Fm which constitutes the body of the sensor, a movable electrode 3 which is disposed in the frame Fm and which is supported so as to be capable of being displaced in a specific direction (the vertical direction in FIG. 1) in response to acceleration, and a pair of stationary electrodes 2 which are disposed so as to face the movable electrode 3 in the specific direction. The top and bottom surfaces of the acceleration sensor 1 are covered with a pair of sealing covers Ug, Lg.

The frame Fm, the stationary electrodes 2, and the movable electrode 3 are formed of conductive material such as silicon. Both the top and bottom sealing covers Ug, Lg are formed of glass, for example.

The movable electrode 3 acts as a mass for use in the detection of acceleration, and the movable electrode 3 (the mass) swings when an acceleration is exerted in the specific direction. As a result, the magnitude of the swing (i.e., the magnitude of the acceleration) is detected on the basis of the change in an electrostatic capacitance caused by the variations in the distances between the movable electrode 3 and the stationary electrodes 2, and is outputted as an electric signal.

Though not shown specifically, an output terminal is provided on each of the stationary electrodes 2 and movable electrode 3, so that the change in the electrostatic capacitance between the electrodes 2, 3 is detected, e.g., as a change in voltage by an external detector circuit (not shown) connected to the output terminals.

In this embodiment, the movable electrode 3 is cantilevered by the frame Fm with a plurality of (e.g., two) beams 4 provided in a plane which is parallel with the specific direction (a plane parallel with the specific direction, i.e., the direction in which the movable electrode 3 is displaced, and parallel with the top and bottom surfaces of the movable electrode 3 and frame Fm in FIG. 2).

The beams 4 are formed integrally with the frame Fm and the movable electrode 3. When an acceleration acts on the movable electrode 3 as a mass, the beams 4 are capable of elastically flexing in the direction in which the movable electrode 3 is displaced (i.e., in the specific direction). Typically, the thickness of the beams 4 is set significantly small in order to make as large as possible the quantity of the swing of the movable electrode 3 as the mass caused by an acceleration to increase the detection accuracy and the sensitivity.

Figure 3:
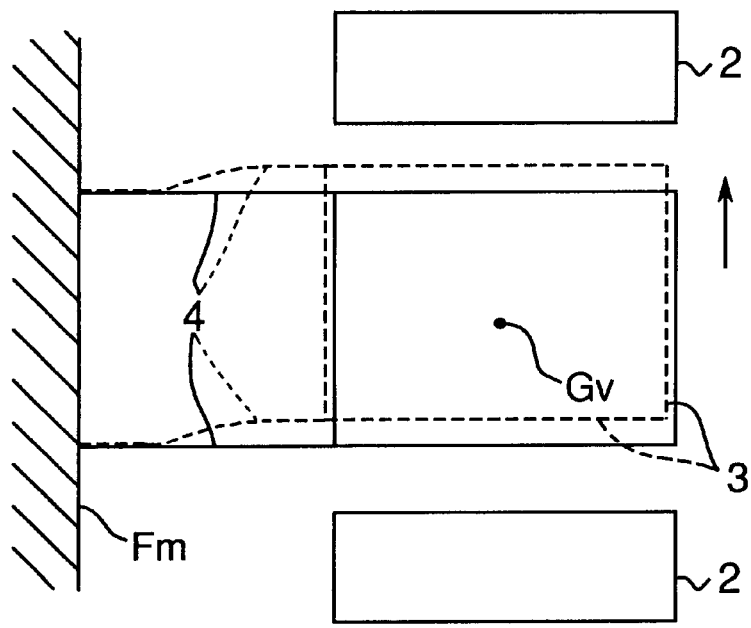
FIG. 3 is an illustrative plan view diagrammatically illustrating a mode of displacement of a movable electrode of the acceleration sensor in accordance with the first embodiment.

In the acceleration sensor 1 arranged as above, the movable electrode 3 as the mass for use in the detection of acceleration is cantilevered by the frame Fm with the plurality of (two) beams 4 which are provided in the plane parallel with the displacement direction of the movable electrode 3 (the specific direction) and which are capable of elastically flexing in the specific direction. When an acceleration acts in the specific direction, accordingly, the two beams 4 flex while remaining parallel with each other as shown in FIG. 3 in detail, so that the movable electrode 3 is displaced with little tilt, i.e., while keeping a high parallelism relative to the stationary electrodes 2 (see the dashed lines in FIG. 3).

Figure 4:
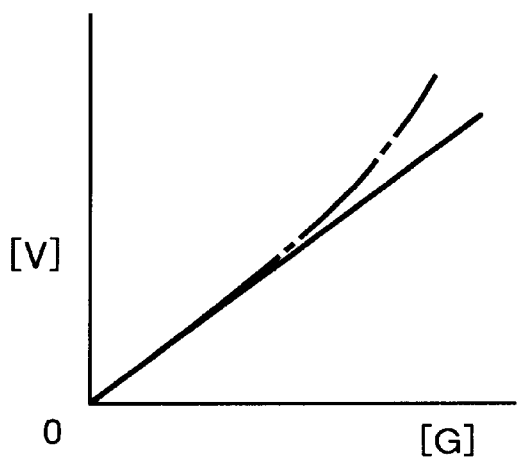
FIG. 4 is a graph illustrating an example of output characteristics of the acceleration sensor in accordance with the first embodiment.

As a result, the linearity of the sensor outputs resulted from the variations in the distances between the electrodes 2, 3 can be maintained relative to the magnitudes of acceleration, for example, as shown in the solid, straight line in FIG. 4, and a sufficient stability can be obtained on the detection accuracy.

(Second Embodiment)

Hereinafter, a second embodiment of the present invention will be described. In the following description, the same elements as in the first embodiment are designated by the same numerals or the same characters, and further description is omitted.

Figure 5:
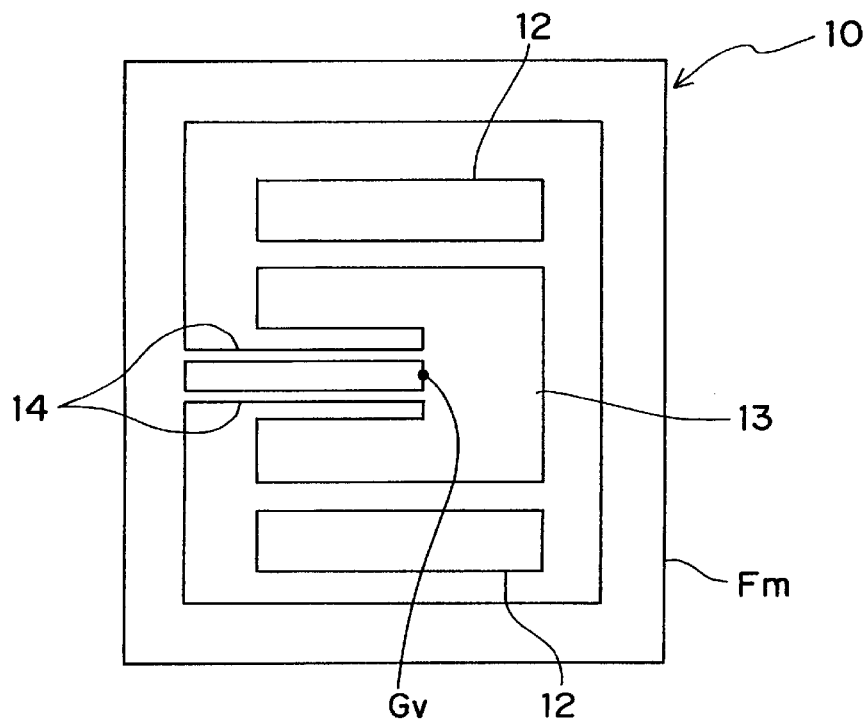
FIG. 5 is an illustrative plan view illustrating the inside of a capacitance acceleration sensor in accordance with a second embodiment of the invention.

In a capacitance acceleration sensor 10 in accordance with the second embodiment, as shown in FIG. 5, a movable electrode 13 is cantilevered, in the same manner as the first embodiment, by a frame Fm with a plurality of (two) beams 14 which are provided in a plane parallel with the displacement direction of the movable electrode 3 (a specific direction) and which are capable of elastically flexing in the specific direction. In the embodiment, additionally, the center of the parts of the movable electrode 13 supported by the two beams 14 is set at a distance not more than a given value from the center Gv of gravity of the movable electrode 13.

The distance between the center of the parts of the movable electrode 13 supported by the two beams 14 and the center Gv of gravity of the movable electrode 13 is preferably as small as possible. In the embodiment, more preferably, the center of the supported parts and the center Gv of gravity are so set as to coincide or generally coincide with each other. The given value can be determined, for example, on the basis of the tolerance on processing and molding in the manufacture of the acceleration sensor, and the like, and thus can be set according to the specifications (such as required accuracy) of the acceleration sensor.

When an acceleration acts in the specific direction, accordingly, the two beams 14 flex while remaining parallel with each other in the same manner as the embodiment 1, and the movable electrode 13 is therefore displaced with little tilt, i.e., while keeping a high parallelism relative to the stationary electrodes 12, so that the same effects as the first embodiment can be obtained.

Additionally, the center of the parts of the movable electrode 13 supported by the two beams 14 is set at a distance not more than a given value from the center Gv of gravity of the movable electrode 13, and the rotation moment about the parts supported by the beams 14 can therefore be as small as possible when an acceleration acts on the movable electrode 13. As a result, when the movable electrode 13 is displaced, the displacement of the movable electrode 13 in the direction of the rotation about the parts supported by the beams 14 can be made as small as possible, so that the parallelism of the movable electrode 13 relative to the stationary electrodes 12 can be further increased. With this arrangement, a higher linearity of the sensor outputs can be ensured and the stability of the detection accuracy can be increased.

In the embodiment, especially, the center of the parts of the movable electrode 13 at points thereof connected to the plurality of beams 14, and the center Gv of gravity of the movable electrode 13, are more preferably set so as to coincide or generally coincide with each other; the rotation moment, therefore, does not act or acts negligibly, so that a higher linearity of the sensor outputs can be obtained.

(Third Embodiment)

Figure 6:
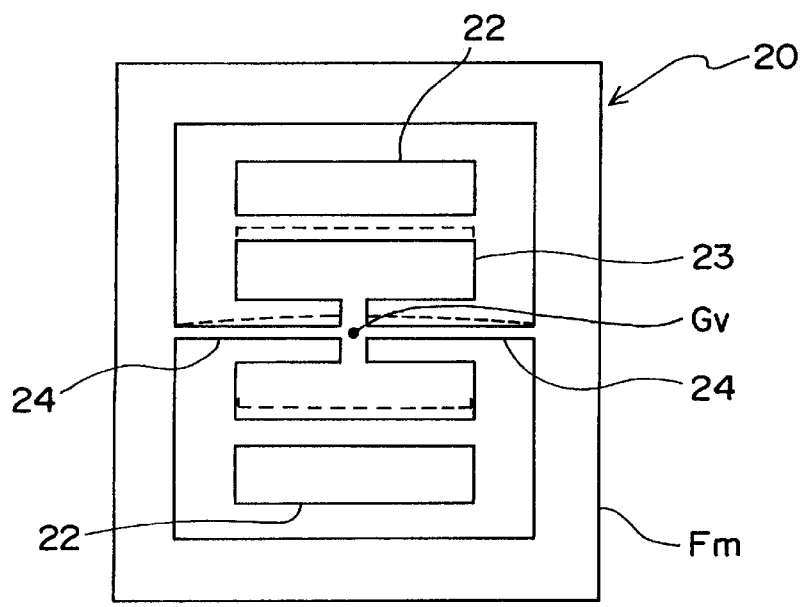
FIG. 6 is an illustrative plan view illustrating the inside of a capacitance acceleration sensor in accordance with a third embodiment of the invention.
Figure 7:
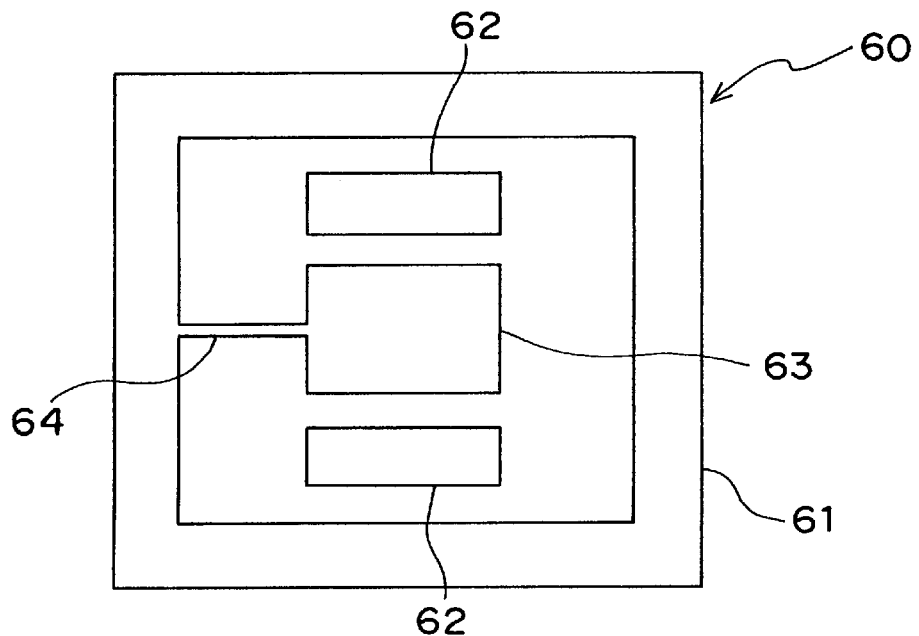
FIG. 7 is an illustrative plan view illustrating the inside of a capacitance acceleration sensor in accordance with the prior art 1.
Figure 8:
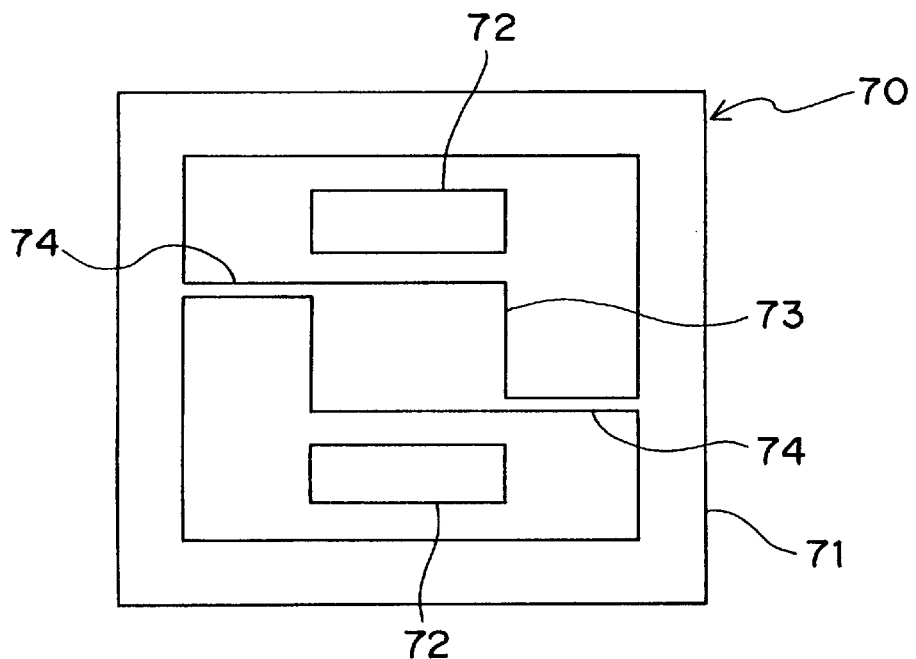
FIG. 8 is an illustrative plan view illustrating the inside of a capacitance acceleration sensor in accordance with the prior art 2.
Figure 9:
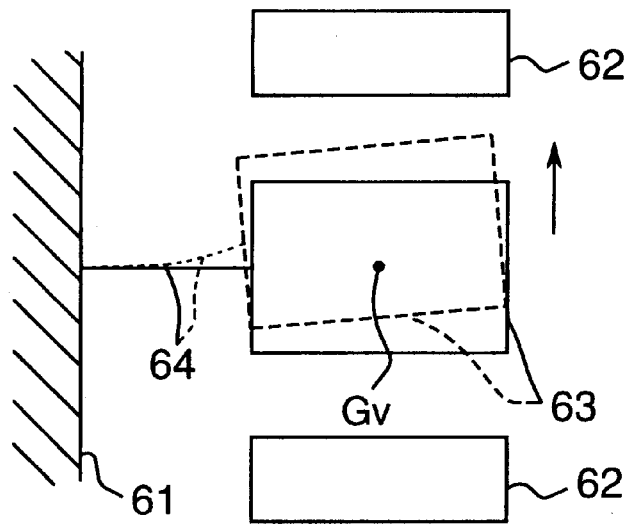
FIG. 9 is an illustrative plan view diagrammatically illustrating a mode of displacement of a movable electrode of the acceleration sensor in accordance with the prior art 1.
Figure 10:
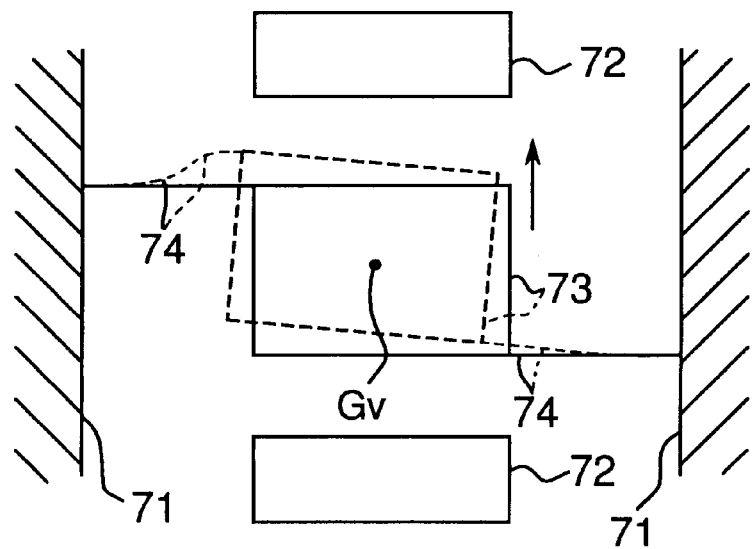
FIG. 10 is an illustrative plan view diagrammatically illustrating a mode of displacement of a movable electrode of the acceleration sensor in accordance with the prior art 2.

Hereinafter, a third embodiment of the present invention will be described. In a capacitance acceleration sensor 20 in accordance with the third embodiment, as shown in FIG. 6, both sides of a movable electrode 23 are supported by a frame Fm with a plurality of (two) beams 24 which are provided in a plane parallel with the displacement direction of the movable electrode 23 (a specific direction), which are arranged generally in a line across the movable electrode 23, and which are capable of elastically flexing in the specific direction.

In the embodiment, more preferably, the lengths of the beams 24 disposed on both sides of the movable electrode 23 are set to be generally equal to each other. That is, the distances from the connections between the beams 24 and the frame Fm to the center Gv of gravity of the movable electrode 23 are set so as to be generally equal to each other. More preferably, the center Gv of gravity of the movable electrode 23 is positioned generally on the line linking the centers of the parts on both sides of the electrode 23 supported by the beams 24.

In the acceleration sensor 20 arranged as above, both sides of the movable electrode 23 as a mass for use in the detection of acceleration are supported by the frame Fm with the plurality of (two) beams 24 which are provided in the plane parallel with the displacement direction of the movable electrode 23 (the specific direction), which are arranged generally in the line across the movable electrode 23, and which are capable of elastically flexing in the specific direction. When an acceleration acts in the specific direction, accordingly, the beams 24 on both sides of the movable electrode 23 flex in the same direction as shown in the dashed lines in FIG. 6, so that the movable electrode 23 is displaced with little tilt, i.e., while keeping a high parallelism relative to the stationary electrodes 22.

As a result, the linearity of the sensor outputs resulting from the variations in the distances between the electrodes 22, 23 can be maintained relative to the magnitudes of acceleration and a sufficient stability can be obtained on the detection accuracy.

In particular, since the lengths of the beams 24 disposed on both sides of the movable electrode 23 are set to be generally equal to each other, the quantities of flex of the beams 24 on both sides surely equal each other in general when the movable electrode 23 is displaced. Consequently, the parallelism of the movable electrode 23 relative to the stationary electrodes 22 can be further increased and a higher linearity of the sensor outputs can be obtained.

Besides, since the center Gv of gravity of the movable electrode 23 is positioned generally on the line linking the centers of the parts on both sides of the electrode 23 supported by the plurality of (two) beams 24, the movable electrode 23 can be displaced while keeping a more stable, high parallelism relative to the stationary electrodes 22 when an acceleration acts in the specific direction, and a higher linearity of the sensor outputs can be obtained.

In each of the above embodiments, the movable electrode is supported by the frame with two beams; however, the movable electrode may be supported with three or more beams.

Thus, it goes without saying that the invention is not limited to the above embodiments but various improvements or modifications on its design may be made without departing from the spirit and scope of the invention.

In accordance with the first aspect of the present invention, the movable electrode as the mass for use in the detection of acceleration is cantilevered by the frame with the plurality of beams which are provided in the plane parallel with the displacement direction of the movable electrode (the specific direction) and which are capable of elastically flexing in the specific direction. When an acceleration acts in the specific direction, accordingly, the movable electrode is displaced with little tilt, i.e., while keeping a high parallelism relative to the stationary electrodes. As a result, the linearity of the sensor outputs resulted from the variations in the distances between the electrodes can be maintained relative to the magnitudes of acceleration, and a sufficient stability can be obtained on the detection accuracy.

Further, in accordance with the second aspect of the present invention, basically the same effects as the first aspect of the present invention can be obtained. Additionally, the distance between the center of the parts of the movable electrode supported by the plurality of beams and the center of gravity of the movable electrode is set so as to be not more than a given value; the rotation moment about the parts supported by the beams can therefore be as small as possible when an acceleration acts on the movable electrode.

As a result, the displacement of the movable electrode in the direction of the rotation about the parts supported by the beams can be made as small as possible, so that the parallelism of the movable electrode relative to the stationary electrodes can be further increased and so that the stability of the detection accuracy can be increased.

Furthermore, in accordance with the third aspect of the present invention, basically the same effects as the sencond aspect of the present invention can be obtained. Additionally, the center of the parts of the movable electrode supported by the plurality of beams and the center of gravity of the movable electrode are set so as to coincide or generally coincide with each other, so that the rotation moment about the parts supported by the beams may not act or may act very little when an acceleration acts on the movable electrode and so that a higher linearity of the sensor outputs can be obtained.

Furthermore, in accordance with the fourth aspect of the present invention, both sides of the movable electrode as the mass for use in the detection of acceleration are supported by the frame with the plurality of beams which are provided in the plane parallel with the displacement direction of the movable electrode (the specific direction), which are arranged generally in a line across the movable electrode, and which are capable of elastically flexing in the specific direction. When an acceleration acts in the specific direction, accordingly, the movable electrode is displaced with little tilt, i.e., while keeping a high parallelism relative to the stationary electrodes. As a result, the linearity of the sensor outputs resulted from the variations in the distances between the electrodes can be maintained relative to the magnitudes of acceleration and a sufficient stability can be obtained on the detection accuracy.

Furthermore, in accordance with the fifth aspect of the present invention, basically the same effects as the fourth aspect of the present invention can be obtained; in particular, since the lengths of the beams disposed on both sides of the movable electrode are set to be generally equal to one another, the parallelism of the movable electrode relative to the stationary electrodes can be further increased when the movable electrode is displaced, and a higher linearity of the sensor outputs can be obtained.

Furthermore, in accordance with the sixth aspect of the present invention, basically the same effects as the invention as the fourth aspect or fifth aspect of the present invention can be obtained. Besides, since the center of gravity of the movable electrode is positioned generally on the line linking the centers of the parts on both sides of the movable electrode supported by the plurality of beams, the movable electrode can be displaced while keeping a more stable, high parallelism relative to the stationary electrodes when an acceleration acts in the specific direction, and a higher linearity of the sensor outputs can be obtained.

What is claimed is:

1. A capacitance acceleration sensor comprising:

a frame which constitutes the body of the sensor;

a movable electrode disposed in the frame and supported so as to be displaced in a specific direction in response to acceleration;

a plurality of beams provided in a plane parallel with the specific direction and cantilevering the movable electrode to said frame and elastically flexing for movement of the movable electrode in the plane parallel to the specific direction; and stationary electrodes which are disposed so as to face the movable electrode in the specific direction;

the sensor detecting the magnitude of an acceleration of the body acting in the specific direction on the basis of a change in an electrostatic capacitance caused by variations in the distances between the electrodes;

the center of mass of the movable electrode being generally on a line linking the points at which the plurality of beams connect to the movable electrode so that rotational moments of said movable electrode at the connections thereof to the beams have a negligible effect on capacitance measurements made by the sensor.

* * * * *